United States Patent [19]

Schmidt

[11] 4,215,300
[45] Jul. 29, 1980

[54] ERROR CORRECTING SERIAL INPUT POSITIONING SYSTEM

[75] Inventor: Robert H. Schmidt, Minnetonka, Minn.

[73] Assignee: Data Card Corporation, Minnetonka, Minn.

[21] Appl. No.: 935,647

[22] Filed: Aug. 21, 1978

[51] Int. Cl.$^2$ .............................................. G05B 19/28
[52] U.S. Cl. .................................. 318/603; 318/562; 318/602
[58] Field of Search ............... 318/600, 603, 562, 571, 318/602

[56] References Cited

U.S. PATENT DOCUMENTS

| | | | |
|---|---|---|---|
| 3,365,634 | 1/1968 | Centner et al. | 318/600 |
| 4,047,003 | 9/1977 | LaRocca et al. | 318/562 X |

*Primary Examiner*—B. Dobeck
*Attorney, Agent, or Firm*—Staas & Halsey

[57] ABSTRACT

A closed loop, error correcting serial input positioning system for varying, at a controlled incremental rate, the angular position of the shaft of a motor in dependance upon train of input command pulses. By utilizing the system in accordance with the present invention, both the speed and position of the motor shaft are controlled.

4 Claims, 10 Drawing Figures

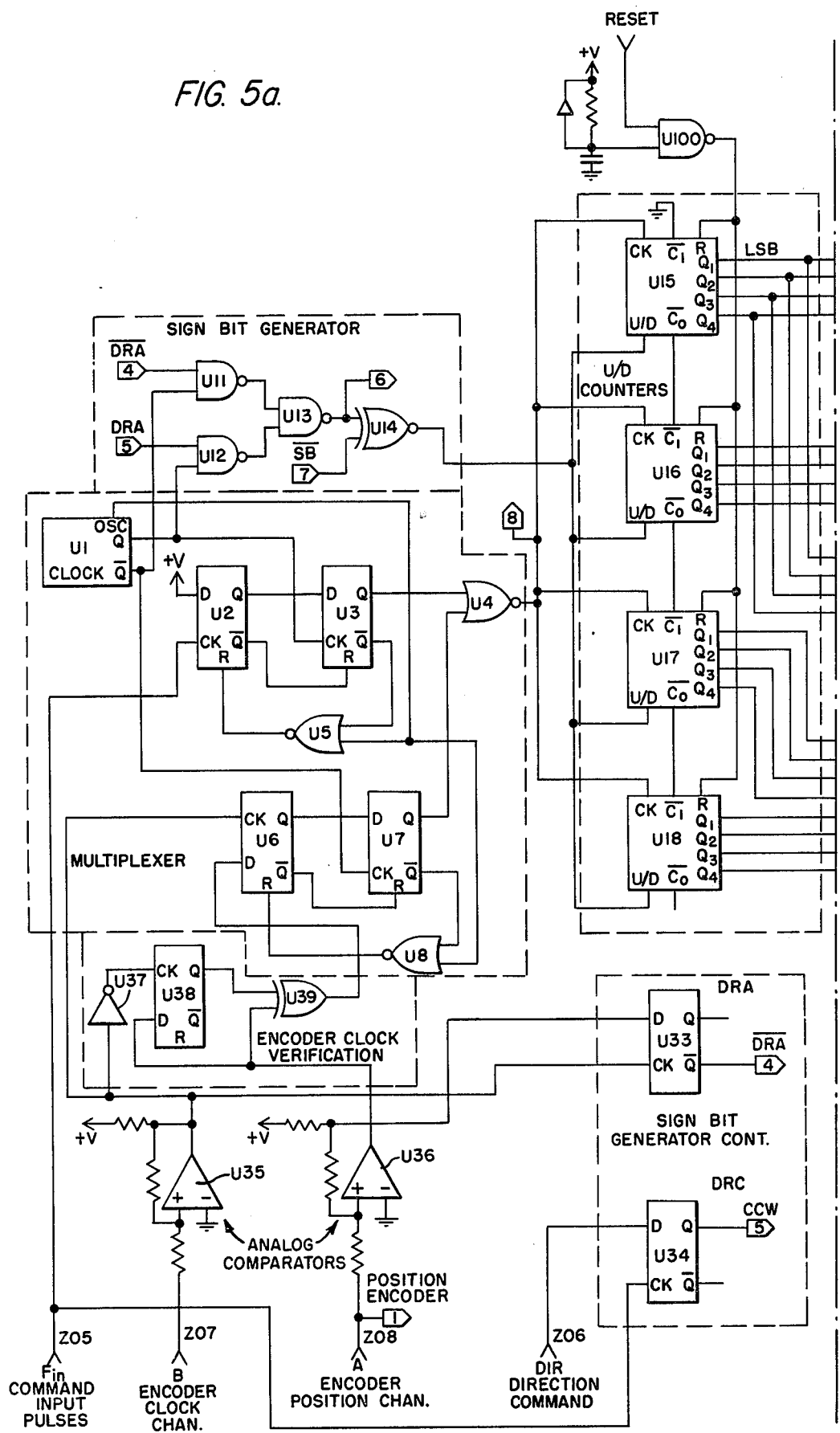

ERROR CORRECTING SERIAL INPUT POSITIONING SYSTEM

BACKGROUND OF THE INVENTION

1. Field of the Invention

The present invention relates to en electronic system by which a motor (e.g.—a permanent magnet d.c. servo motor) is caused to rotate from a first angular position, $\theta_1$, to a second angular position, $O_2$, at an angular speed $\omega$ dependent upon the input signals to the system.

2. Description of Prior Art

Digital positioning systems are typically characterized by how digital data, corresponding to the "move distance," is loaded into the system.

In parallel input systems, a parallel binary or BCD digital word having a plurality of bits corresponding to the distance to be moved is simultaneously loaded into the system. In a typical system the parallel word is preset into a down counter 100 (FIG. 1). The parallel outputs of the down counter 100 are connected to a digital to analog (D/A) converter 101 which ultimately drives the servo amplifier used to drive the motor. As the motor begins to rotate, pulses are emitted from an incremental encoder mechanically connected to the motor shaft. N pulses per revolution are emitted, where N is the encoder line density. The encoder pulses cause the count in the down counter 100 to decrement by one count for each encoder pulse. It can be seen that the contents of the down counter 100 represents the distance yet to be moved and, since this information (via the D/A converter 100) is ultimately used to drive the motor, when the contents of the down counter 100 reaches a zero count, the drive signal from the servo amplifier to the motor will be zero and the motor's motion will cease.

Since move distance data is loaded in parallel, there is no inherent external means by which speed may be synchronously (zero long term speed error) controlled during a move. This is a serious drawback in single or multiple axis systems where speed as well as position must be known and controlled on a real time basis (e.g.—a two axis contouring system).

Parallel input systems, then, are characterized by the ability to perform point to point positioning functions at some preset speed, usually internally programmed. Speed is not easily synchronized to an external source during a move.

Serial input systems, on the other hand, load data serially, one bit at a time (FIG. 2), into an up/down counter 102. Under normal operating conditions, input pulses cause the counter 102 to count up, encoder pulses cause it to count down. As in the parallel system, the parallel outputs of the up/down counter drive a D/A converter 103 which drives the servo amplifier. In a serial input system, however, the rate at which serial input pulses are loaded corresponds exactly to motor speed (proportional to the rate at which encoder pulses count the counter down) and the total quantity of input pulses corresponds exactly to the distance to be moved (total number of encoder pulses). Consequently serial input systems are capable of moving a motor shaft through a precise angle and can simultaneously precisely control the motor's angular velocity during a move. Serial input systems therefore perform a dual role of enabling both precise velocity control and precise position control, making them more useful for those applications requiring these features.

SUMMARY OF THE INVENTION

FIG. 3 illustrates a simplified version of a serial input positioning system. A permanent magnet dc servo motor 110 with a two channel quadrature incremental encoder 111 and an analog tachometer 112 are mechanically coupled to the motor shaft. The motor 110 is driven by a servo amplifier 113. Alternately, analog velocity information may be generated directly from the encoder 111, thus eliminating the need for the analog tachometer 112. System operation is the same for both methods. The digital positioning indexer 114 processes the input signals (input pulses fin and direction bit DIR) and the feedback signals (incremental encoder, $IE_1$ and $IE_2$, and analog tachometer At) to produce an analog signal 115 to precisely drive the motor 110 VIA the servo amplifier 113 to the new position and at the desired speed determined by the fin and DIR signals.

The function of indexer 114 is to cause the motor 110 to rotate through an angle corresponding to one encoder "line" or increment (of which there are typically between 1 and 1000 per revolution) for each input pulse received and at a speed synchronous with the rate at which input pulses arrive. When the motor 110 is at rest, the encoder 111 is used as a position feedback transducer to provide a detent or holding action on the motor shaft to a preferred position.

The present invention relates particularly to the indexer portion of a serial input positioning system. However, some features of the design, such as positioning error correction circuit, would be equally useful on other types of systems. Some of the salient features of the system design include:

1. A data handling system (multiplexer) whereby asynchronous serial input data and encoder pulses are automatically synchronized to an internal clock, thereby enabling the system to distinguish between input pulses and encoder pulses (even though they may occur simultaneously) and cause a single set of up/-down counters to count up or down as appropriate and without any errors caused by the asynchronous nature of the input and encoder pulses (a single set of up/down counters cannot count up and down at the same time). The design of the multiplexer results in error free operation, (no counts missed or incorrect counting), with the economy of a single set of counters.

2. A sign bit generator and a positioning system which precisely defines how the up/down input of the counter must respond to input or encoder pulses under all eventualities of motion or disturbances in either direction of rotation. This results in automatic error correction should the system overshoot during a move or be taken off position by an external disturbing force.

3. A method whereby it can be ensured that an encoder pule actually represents physical motion and not the result of an ocillatory condition that may cause a multiplicity of encoder pulses but represents no net motion.

BRIEF DESCRIPTION OF THE DRAWINGS

FIGS. 5a and 5b form a schematic diagram of the indexer portion of a serial input positioning system.

DESCRIPTION OF THE PREFERRED EMBODIMENT

The function of the indexer is to cause the motor to rotate through an angle which precisely corresponds to the number of input pulses received in the direction command, and at a speed which bears a fixed relationship to the rate at which input pulses are received. Stated differently, the total number of input pulses must equal the total number of encoder pulses and the steady state input pulse PRF must equal the steady state encoder pulse PRF.

Figure 1:
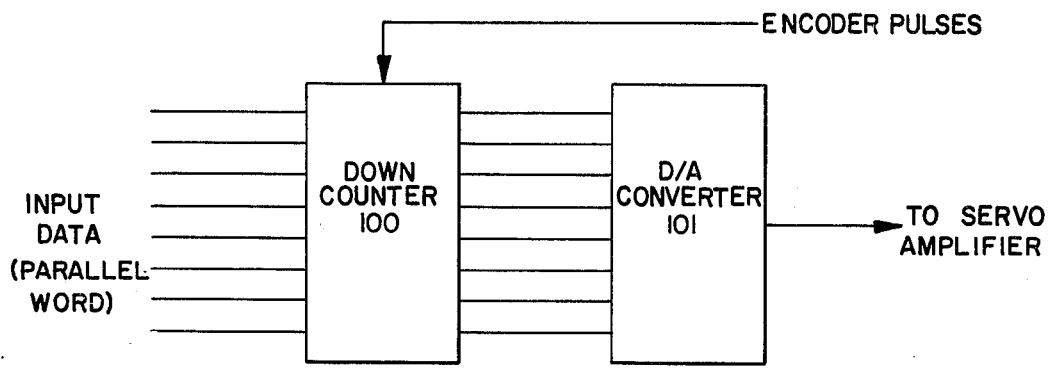
FIG. 1 is a simplified block diagram of a prior art parallel input positioning system.
Figure 2:
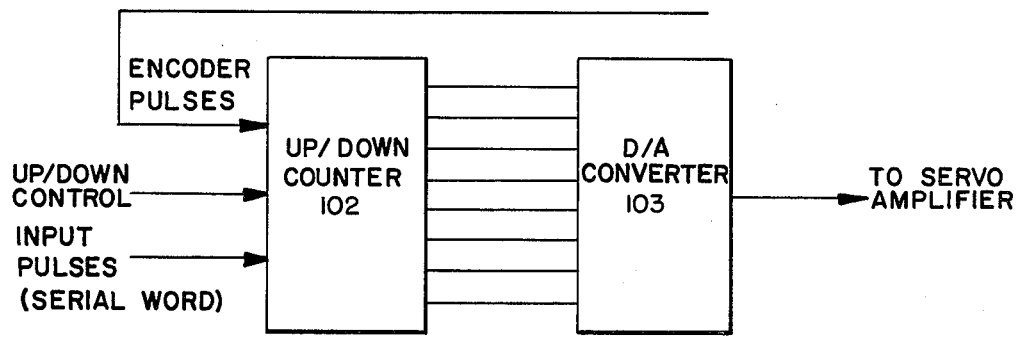
FIG. 2 is a simplified block diagram of a serial input positioning system.
Figure 3:
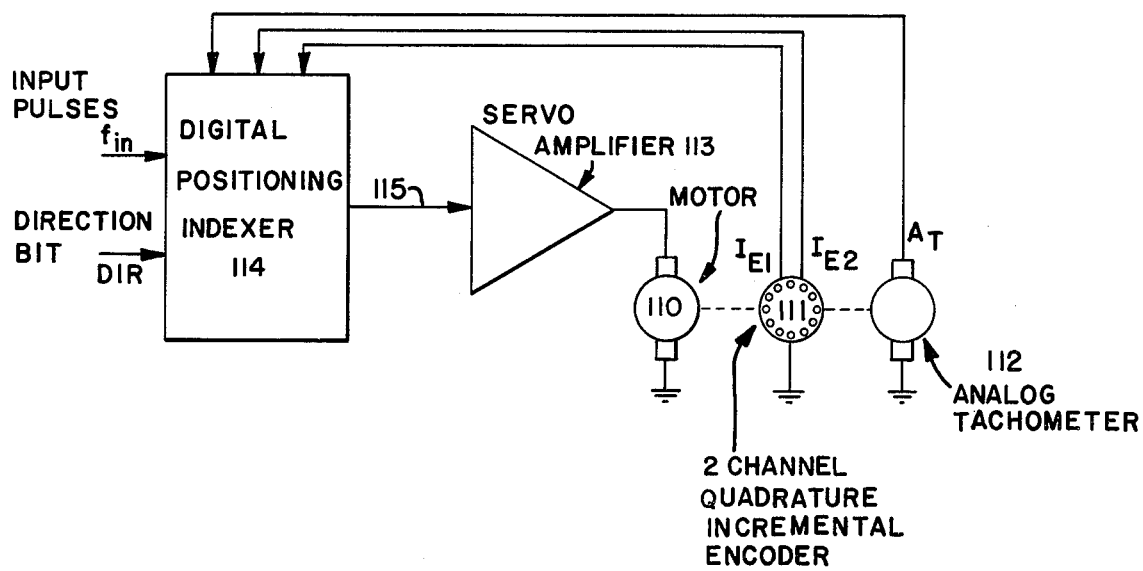
FIG. 3 is a generalized block diagram of a complete serial input positioning system.
Figure 4:
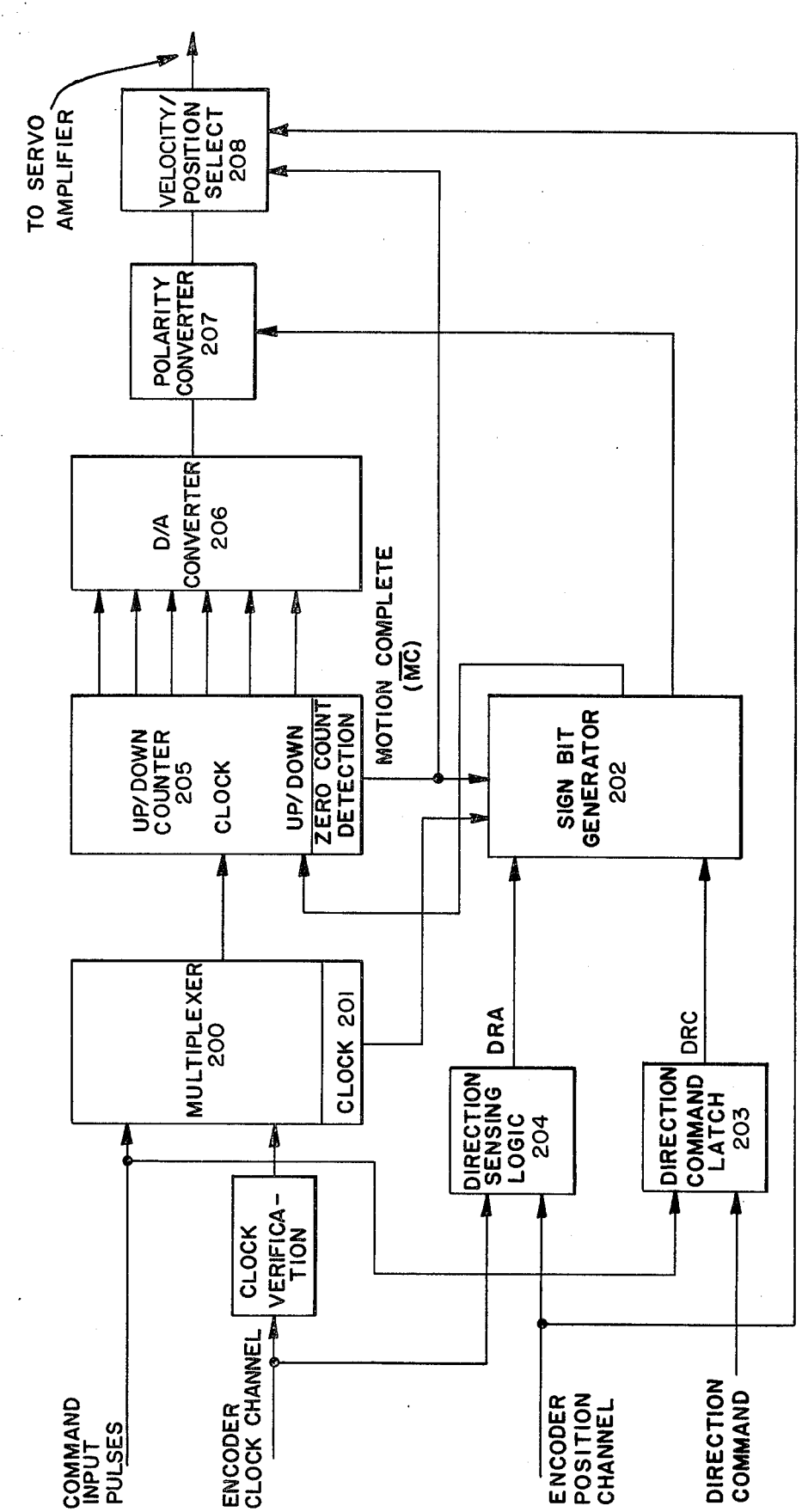
FIG. 4 is a simplified block diagram of the indexer portion of a serial input positioning system.
Figure 5B:
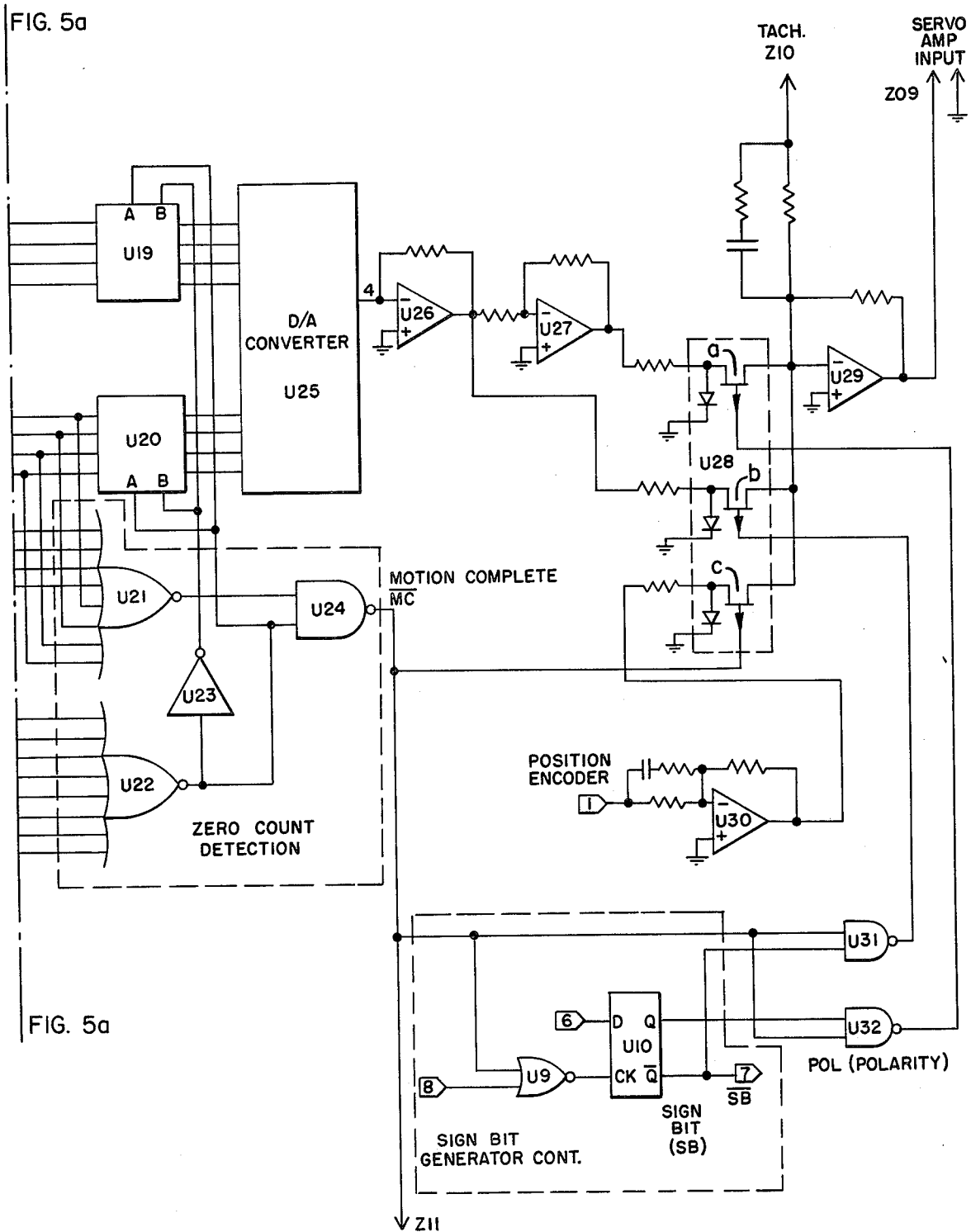

The indexer system, as illustrated in FIGS. 4 and 5, consists of several elements and is described below.

A multiplexer 200 which receives command input pulses (which are used to determine the desired position and speed of the motor shaft) and pulses from the encoder clock channel (which determine the actual position and speed of the motor shaft.) The input pulses and encoder pulses are asynchronous, (i.e., they may occur with any time relationship to each other). Asynchronous pulses are very difficult to handle in this manner since a single set of up/down counters cannot simultaneously count up and down. Thus input or encoder pulses could easily be lost, or counted wrong, (i.e.—counted up instead of counted down.)

The multiplexer 200 converts the input data from asynchronous data to data that is synchronous with an internal clock 201 (typically having a 100 KH₃ PRF). As illustrated in FIG. 5, the command input pulses go directly to the clock input of "D" flip-flop U2. The rising edge of an input pulse causes a logic "1" to be transferred to the Q output. The Q output of U2 is connected to the D input of U3. U3 is clocked by the rising edge of the clock's Q output (U1). If a logic "1" is present on the D input of U3, then an input pulse must have occurred since the last rising edge of the Q output of U1, (i.e.—during the last 10 microseconds). At the rising edge of the Q output of U1 the logic "1" on the D input of U3 is transferred to the Q output of U3 causing the output of U4 (used as the clock signal for the up-/down counters U15-U18) to become a logic "0." At this time the Q output of U3 is also low (i.e.—a logic "0") but the OSC output of U1 is high (i.e.—a logic "1") for 2.5 microseconds after which it goes low. When the OSC output of U1 goes low the output of U5 goes high, resetting U2 which in turn resets U3. The Q output of U3 then goes low, forcing the output of U4 to go high which completes the formation of the up/down counter clock pulse caused by an input pulse. Thus, the system has stored as asynchronous input pulse, read its presence in a synchronous manner, emitted a clock pulse to the up/down counters U15-U18, and then reset itself. The only restriction in operation is that input pulses cannot have a PRF which is greater than the rate at which they can be synchronously read, (in this case, 80 KHz, which is much greater than required).

Encoder pulses are handled by the system in a similar fashion, with the following one exception.

The validity of an encoder pulse is first checked with a Clock Verification circuit, comprising flip-flop U38 and gates U37 and U39, to ensure that an encoder pulse represents actual physical motion of the motor shaft before it is allowed to be counted. Flip-flops U6, U7, and gate U8 handle valid encoder pulses in a manner identical to the way in which input pulses are handled. Up/down counter clock pulses which are generated in response to encoder pulses are "OR'd" with those generated by input pulses in gate U4. Encoder pulses are sampled on the rising edge of the $\overline{Q}$ output of U1, and are sampled 5 microseconds after the clock pulses are sampled. Thus the system alternately samples the input pulses and the encoder pulses and generates a clock pulse in either case. However, by looking at the state of the Q output of U1 and the $\overline{Q}$ output of U1 when a clock pulse is present, it can easily be determined whether the clock pulse was caused by an input pulse or by an encoder pulse. Also, since input and encoder pulses are always sampled alternately (never at the same time), the up/down control of the U/D counter can be made to count up or down on encoder pulses or up or down on input pulses based on other system inputs. This is accomplished in the sign bit generation circuitry.

To understand the operation of the sign bit generator 202, the basic philosophy behind the positioning system in accordance with the present invention must be examined in detail as set forth below.

Assume that the motor 110 and its mechanically connected encoder 111 are initially at rest. The input pulses "$f_{in}$" are always accompanied by an appropriate level on the direction command input DIR (i.e.—clockwise or counterclockwise). This information (i.e.—the input pulses fin and DIR bit) are stored in the direction command latch 203 having output DRC (FIG. 4). In addition, the information as to the direction corresponding to each encoder pulse (i.e.—CW or CCW) is determined by the direction sensing logic 204, having output DRA.

The system timing is set so that the intended direction represented by an input pulse and the actual direction represented by an encoder pulse is known before the pulse is counted by the up/down counter 205. This allows the up/down control line to be set before the clock pulse arrives so that the appropriate action (i.e.—count up or count down) may be taken by the up/down counter 205.

Thus, a system in accordance with the present invention can distinguish between encoder pulse clocks and input pulse clocks. Furthermore, the sign bit generator 202 is capable of controlling the up/down counter 205 to count either up or down as appropriate.

The system incorporates a real time positioning system algorithm which controls the up/down counter 205 in a fashion which will ultimately be used to produce motion by the motor 110 in response to input pulses fin and accompanying direction commands DIR and will also automatically correct positioning errors caused by external torque disturbances or by overshoots caused by excessive load inertia, etc.

Each input pulse fin is accompanied by a direction bit, DIR. used to generate the DRC signal (corresponding to the commanded direction) and the quadrature encoder pulses are used to generate the DRA signal (corresponding to actual direction of its respective encoder pulse).

The commanded direction signal DRC is generated by flip-flop U34, a "D" type flip-flop, and is updated by each input pulse $F_{in}$. The desired direction signal input, DIR, has been arbitrarily chosen such that a logic "1" level corresponds to a counterclockwise rotation and a logic "0" corresponds to a clockwise rotation of the motor 110. The DIR signal appears at the D input of flip-flop U34 and is transferred to the Q output of U34 by each positive-going clock ($F_{in}$) transition. Thus, each input pulse has an associated desired direction.

Figure 6A:
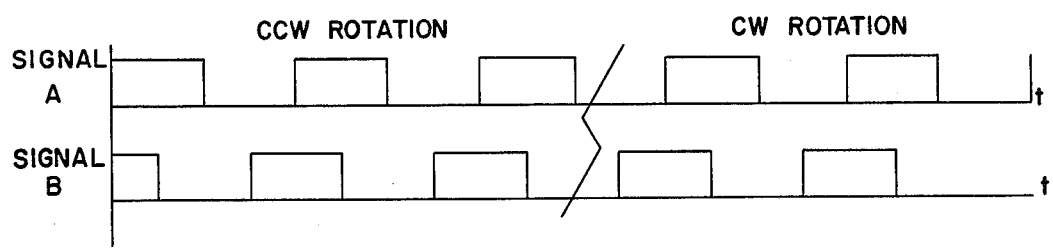
FIG. 6a illustrates the phase relationship between the squared outputs of the quadrature encoder.
Figure 6B:
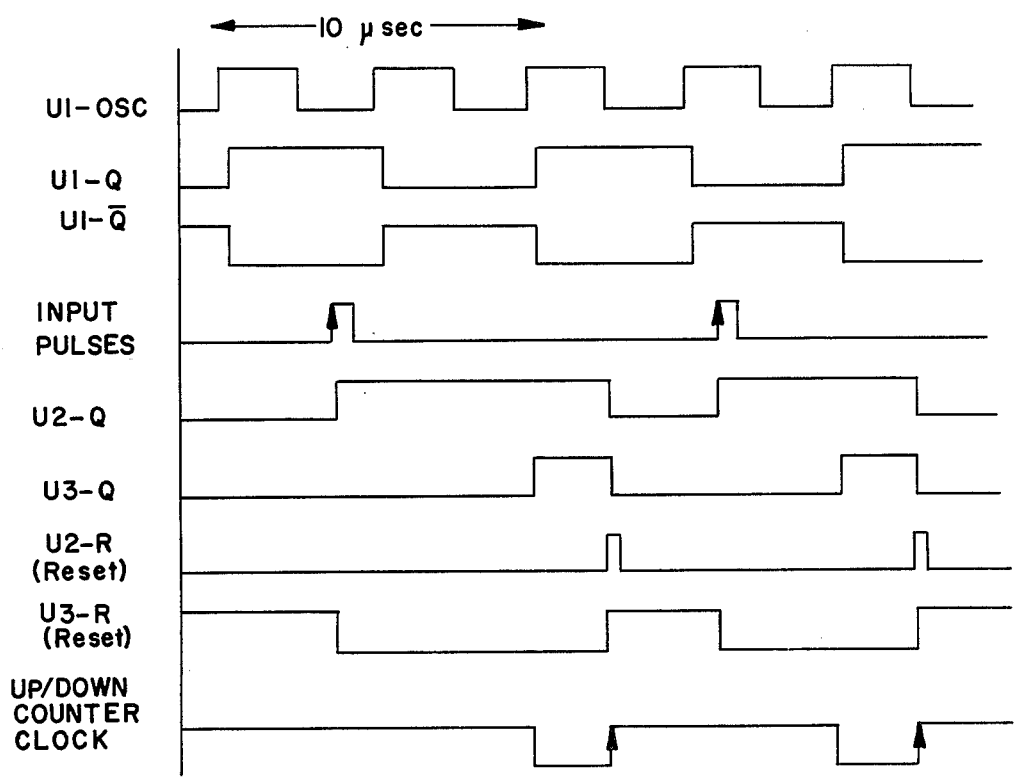
FIG. 6b is a timing diagram illustrating the time relationship among several of the multiplexer signals.

Analog comparators U35 and U36 function as zero crossing detectors and are used to "square up" the quasi-sinusoidal or triangular signals obtained from the two channel quadrature encoder 111, (i.e. signals A and B). The quadrature encoder signals A and B are used to determine the actual direction of the motor 110 as represented by the signal DRA. It is well known that the phase relationship between the two encoder outputs changes with the direction of rotation. For one direction the phase of signal A will lead signal B while for the other direction the phase of signal A will lage signal B (FIG. 6a).

The squared signal from U35, corresponding to signal B, is used to clock "D" type flip-flop U33 on its rising edge. The squared signal from U36, corresponding to signal A, is used as the "D" input flip-flop U33. It can be seen from FIG. 6a that a logic "1" will appear at the Q output of flip-flop U33 for a CCW rotation and a logic "0" will appear at the Q output of flip-flop U33 for a CW rotation.

Input pulses, with their accompanying direction bit stored as signal DRC, define the new intended stable rest position of the motor 110, with respect to its present position. Encoder pulses define the actual position of the motor with respect to the stable rest position. The overall function of the indexer may therefore be thought of as causing the motor 110 to rotate in a direction such that ultimately the actual position of the motor equals the desired position of the motor. The function of the sign bit generator 202, however, is simply to determine whether a given up/down counter clock pulse should be counted up or down so that the magnitude of the up/down counter 205 contents always represents the number of encoder pulses which separates the intended position from the actual position. The sign bit itself determines the polarity of the difference, (i.e., whether the actual position is clockwise or counterclockwise of the intended position).

To develop the positioning algorithm it is convenient to consider a linear field of data points corresponding to encoder increments (or motor angular positions) about some arbitrary zero reference. This is illustrated in FIG. 7.

Assuming the system is at rest at point zero (i.e.—the counter contents are zero) and that power is removed from the motor 110 so that it cannot respond to positioning commands but can be rotated by hand. The electronics are still operational, however, and must respond to input or encoder pulses such that the up/down counter 205 contents correspond to the number of encoder increments that separate the desired position from the actual position. The sign bit generated in sign bit generation 202 must indicate the polarity of the difference. The sign bit is determined by the direction in which the system left zero count and whether it was caused by an input of encoder pulse.

Figure 7:
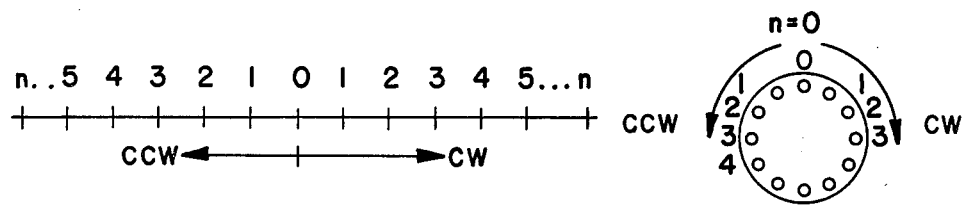
FIG. 7 illustrates a linear data field having positions corresponding to the angular encoder increments.

Referring to FIG. 7, only four possible conditions could have caused the system to leave zero count, namely:

(a) A CW input pulse
(b) A CCW input pulse
(C) A CW encoder pulse
(d) A CCW encoder pulse The sign bit must indicate the polarity indicative of the direction of travel from the actual position to the desired position. Input pulses may be thought of as modifying the desired position whereas encoder pulses may be though of as keeping track of actual position. From the above discussion the following conclusions can be derived:

(a) A CW input pulse indicates that the actual position is CCW from the desired position (i.e. actual position is zero, desired position is one encoder increment CW).

(b) A CCW input pulse indicates that the actual position is CW from the desired position.

(c) A CW encoder pulse indicates that the actual position is CW from the desired position.

(d) A CCW encoder pulse indicates the actual position is CCW from the desired position.

From (a) through (d), a general rule for the sign bit may be formulated. For example, (a) and (d) (CW input pulses and CCW encoder pulses) indicate that actual position is CCW from desired position whereas (b) and (c) (CCW input pulses and CW encoder pulses) indicate that actual position is CW from the desired position.

We then assign an arbitrary binary level to the sign bit:

1 implies that actual position is CCW from desired position.
0 implies that actual position is CW from desired position.

It is clear that (a) and (d) must produce a sign bit of "1" and (b) and (c) should produce a sign bit of "0."

A general rule for controlling the up/down line on the up/down counters 205 must now be established. The up/down counter 205 contents indicate the total number of encoder increments separating the actual position from the desired position and the sign bit indicates the polarity of the difference. Once the sign bit is known a general rule for controlling the up/down line of the up/down counter 205 may be deduced from FIG. 7.

If the sign bit is a "0" then the actual position is CCW from the desired position. Thus:

(a) CW input pulses and CCW encoder pulses must cause the up/down counter 205 to count up since these conditions increase the separation between the actual and desired position.

(b) By the same reasoning, CCW input pulses and CW encoder pulses must cause the up/down counter 205 to count down since these conditions decrease the separation between actual and desired position.

Similarly, if the sign bit is a "1" then the counting action in (a) and (b) is inverted. The counting rules may thus be tabulated as follows:

Sign bit = 0
  CW input pulses count up
  CCW input pulses count down
  CW encoder pulses count down
  CCW encoder pulses count up
Sign bit = 1
  CW input pulses count down
  CCW input pulses count up CW encoder pulses count up
CCW encoder pulses count down The above general rules for the sign bit and the up/down line are easy to implement with a minimum of hardware and account for all possible conditions of operation. Thus the system always knows the magnitude of the position error and its sign. A D/A converter 206 translates this digital information into a signal to drive the servo amplifier 113. The magnitude of the servo drive voltage is proportional to the position error (up/down counter 205 contents) and the polarity necessary to reduce the position error to zero is determined by the sign bit.

In practice, the sign bit is generated as follows (FIGS. 5a and 5b):

Data present on the D input of flip-flop U10 when a clock (i.e.—the positive going edge generated by gate U9) occurs becomes the sign bit. One input of U9 is the MC (Motion complete) signal, indicating that the counter U15–U18 contents is equal to zero. The MC signal is generated by gates U21, U22 and U24. The other input of U9 is the up/down counter clock which is normally high but goes low for 2.5 usec whenever an input pulse or an encoder pulse has been sampled by the multiplexer. Thus, the sign bit clock SB is generated by the falling edges of the up/down counter clock only if the up/down counter contents is equal to zero (i.e.-The system is at its rest position and is about to be caused to leave its rest position). The level at the D input of flip-flop U10 when its clock is present will determine the sign bit. The system must determine the direction of movement when the system left the zero count position and whether leaving the zero count position was caused by an input pulse or an encoder pulse. Since the rising edge of the "Q" output of U1 effectively interrogates flip-flop U3 for the presence of an input pulse and the rising edge of the "$\overline{Q}$" output of U1 effectively interrogates flip-flop U7 for the presence of an encoder pulse and since the presence of either initiates the up/down counter clock, the level of either the Q or $\overline{Q}$ output of U1 can be used to determine whether a sign bit clock at flip-flop U10 was caused by an input or encoder pulse. Furthermore the level of the Q and $\overline{Q}$ outputs of U1 can be used to generate signals enabling the gating in of direction information; DRC if the sign bit clock was caused by an input pulse, $\overline{DRA}$ if it was caused by an encoder pulse. This is accomplished by gates U11, U12, and U13 which act as a data selector, providing the DRC output at the output of gate U13 (also to the D input of flip-flop U10) when the Q output of U1 is high (indicating that an input pulse is about to be counted) or providing the $\overline{DRA}$ output at the output of gate U13 when an encoder pulse is about to be counted.

The sign bit can only be changed or updated when the up/down counter 205 contents was at zero and then left zero. Flip-flop U10 stores the sign bit information until the zero count is again reached then updates and stores the new sign bit information.

Once the sign bit has been stored, the up/down line of the up/down counter must be controlled in accordance with the previously described algorithm. The sign bit is provided at one input of exclusive or gate U14. Inverting the value of the sign bit has the effect of inverting the desired counting action of the up/down counter 205. Gate U14 accomplishes this inversion since, when one input of an exclusive or gate is "1," the relationship between the output and the other input is inverting whereas if one input is "0" the relationship between the output and the other input is noninverting. This is the correct system response to a change in sign bit as may be seen from the up/down counting algorithm.

Thus, the sign bit and up/down line generation circuitry follow the previously described algorithm and a rather complex conceptual idea has been reduced to rather simple hardware due mainly to the all inclusive nature of the algorithm and the synchronous manner in which input and encoder pulses are sampled. U15 through U18 comprise the up/down counter 205. As mentioned previously the up/down counter functions to count clock pulses from the output of gate U4 (the rising edge thereof) either up or down as instructed by the sign bit generator so that the counter content (e.g.—a 16 bit parallel binary word) represents the number of encoder increments which separates the actual and desired motor position. In the configuration illustrated in FIG. 5, the least significant eight bits are connected to a D/A converter U25, (other systems could use more than or less than 8 bits for the D/A converter, depending on system constraints), through an 8 pole double throw switch, U19 and U20, which transmits all 1's to the D/A converter U25 when a count of 256 or greater is present in the counters. This is necessary since the less significant bits of the counter "roll over" many times during count up or count down function (i.e., U15 rolls over every 16 counts) and would do so even if the count were greater than 256 which should represent a saturated D/A converter. The D/A converter, U25, sinks a current at its output pin 4 proportional to the parallel 8 bit binary word at its input pins. This word will be all 1's for counter contents greater than 255 and the actual count for counts of 255 or less. The D/A converter U25 drives a current to voltage converter U26 which develops a voltage proportional to the counter contents for counts less than 256 and a constant maximum voltage for counts of 256 or greater. Amplifier U27 inverts the output of converter U26. FET switches U28-a and U28-b select either the D/A output (buffered by U26) or the inverted D/A output (U27) as commanded by the sign bit generator. (Actually, the FET switches U28-a and U28-b are controlled by gates U32 and U31 respectively. The output of U26 and U27 are thus used to drive the servo amplifier through summing amplifier U29.

Gates U21, U22, U23, and U24 form the zero count detection circuitry. The output of gate U22 is a logic "1" when the up/down counter chain U15–U18 has zero's stored in the eight most significant bits thereof. Gate U23 inverts the output of gate U22 and gates U32 and U23 are together used to address the 8 pole double throw switches U19 and U20 so as to transmit the contents of the eight least significant bits of counter chain U15—U18 to the D/A converter U25 only when the eight most significant bits thereof equal zero. This serves to hold the D/A converter U25 in "saturation" when the count is greater than 255.

Gates U21, U22 and U23 determine when all of the counter chain stages U15–U18 has zero's stored therein. The state wherein the counter contents are all zero indicates the desired move has been made and the system is at its rest position. The output of gate U24, $\overline{MC}$ (MOTION complete), causes FET switch U28-c to be conducting and FET switches U28-a and U28-b to be nonconducting. This causes the servo amplifier driving the motor to enter a position mode. The input to position amplifier U30 is the position signal of the quadrature optical encoder and drives the servo amplifier through amplifier U29 in such a way as to force the encoder signal (having a triangular or sinusoidal waveform) to its zero crossing and to provide an opposing torque signal to keep the motor there. Nand gates U31 and U32 control FET switches U28-a and U28-b determine the direction in which motor torque is applied. The sign bit generator output SB will enable the conduction of either switch U28-a or switch U28-b, depending on the direction in which torque is being applied to the motor, and providing that zero count has not been reached by counter chain U15–U18. When a zero count is reached by counter chain U15–U18, gates U31 and U32 disable both FET switches U28-a and U28-b. FET switch U28-c is then turned on and the system enters the position mode.

The multiplexer 200 accepts a low to high transition on the clock inputs of D flip-flops U2 and U6 as input pulses or encoder pulses respectively. Input pulses can be made "well behaved" (i.e., a pulse will have a well defined pulse width and rise and fall time) such that the multiplexer 200 will recognize and count each pulse, provided of course that the time interval between pulses is not so short that the multiplexer cannot reset prior to the next pulse arrival (e.g.—12.5 usec in this case).

Figure 8:
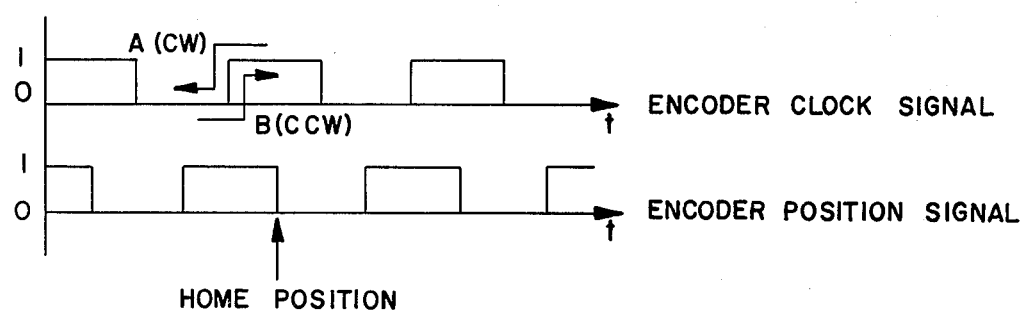
FIG. 8 illustrates the waveforms of the two outputs of the quadrature encoder.

Encoder pulses, on the other hand, are not well behaved. Consider the case in which the motor is mechanically oscillating about the zero crossing of the clock channel of the encoder. The squared output of the clock and the quadrature position signal are shown in FIG. 8. As the oscillatory motion of the motor shaft continues, each time path B (FIG. 8) is traversed, a low to high signal is generated which would be interpreted as a valid encoder pulse to the multiplexer 200, (if the encoder clock verification circuitry were not added), even though the repetitive oscillatory motion does not represent true permanent displacement of the motor shaft. Thus, a given number of command input pulses, intended to represent the desired displacement of the motor shaft (i.e. the number of valid encoder clock pulses that should be generated) could be counted down even though the desired motor shaft displacement did not occur. Without the encoder clock verification circuitry to prevent such action, the entire positioning system would be inaccurate and unworkable.

When the system is in its rest or home position (FIG. 8), a position loop is activated which uses the sinusoidal output of the position encoder signal as a position transducer and drives the motor to the encoder zero crossing. It may be seen that only one encoder slope is stable (provides negative feedback) for a given rotation. For example, the negative going slope of the position encoder output is stable for CCW rotation and the positive going slope is stable for CW rotation. Since comparators U35 and U36 are noninverting, the squared outputs have the same phase relationship as the sinusoidal encoder signals.

When the position encoder is at its home position, the output of the clock channel is high. Encoder clocks are counted on the rising edge of the encoder clock signal (FIG. 8). Whenever the system is at the home position a first time, the encoder clock signal is high and must go low before it can go high again in an attempt to produce an encoder clock pulse. The encoder clock verification circuit consisting of inverter U37, D flip-flop U38 and exclusive-or gate U39. Together, they check the direction of the negative going edge of the clock signal (positive going edge at the clock input of U38) and store the result in flip-flop U38. From FIG. 8 it can be seen that for a CW rotation, the position encoder signal is a logic "1" during the negative transition of the clock signal (Path A) For a CCW rotation, the position signal is a logic "0" during the negative transition of the clock signal (Path B). The logic level of the position signal is provided at the D input of flip-flop U38 and is stored therein on the negative transition of the clock encoder signal. A logic 1 at the output of exclusive-or gate U39 represents a valid count and will thus provide a logic 1 to the D input of flip-flop U6 in the multiplexer, enabling flip-flop U6 to count an encoder clock on the positive transition of the encoder clock signal.

For a CW rotation, the Q output of flip-flop U38 will be a logic "1" at the falling edge of the encoder clock. If rotation continues in the same direction (valid motion) the logic level of the encoder position signal will go low prior to the next rising edge of the clock signal. When the output of the encoder position signal goes low, the output of gate U39 goes high, enabling the multiplexer D flip-flop U6 to store a valid encoder clock at the next rising edge of the encoder clock signal. If, prior to the rising edge of the encoder clock signal, the motor reverses, the position signal will go high prior to the rising edge of the clock signal. Since the Q output of flip-flop has stored a 1 (representing CW rotation) and the other input to exclusive or gate U34 is a 1, the output of gate U39 will be a logic zero and flip-flop U6 will ignore the next positive encoder clock pulse until a negative transition in that direction occurs. Thus, the circuit requires that the encoder clock signal have a negative transition in a given direction prior to a positive transition in the same direction for the encoder pulse to be valide (representing the physical motor rotation necessary for one complete position encoder cycle).

While the above referenced embodiment of the invention has been described in considerable detail, it will be appreciated that other modifications and variations therein may be made by those skilled in the art without departing from the true spirit and scope of the invention.

What is claimed is:

1. A closed loop error correcting serial input positioning system for varying at a controlled incremental rate the position of the shaft of a motor in dependance upon a plurality of serial command pulses, comprising:
   an encoder means, mechanically coupled to said motor shaft, for providing a plurality of encoder pulses in response to the angular position of said motor shaft;
   a multiplexer means operatively coupled to said encoder means for providing a plurality of output pulses, selected from one of either said input command pulses and said encoder pulses;
   an up/down counter means, operatively coupled to said multiplexer means for counting said output pulses of said multiplexer means in dependance upon the angular position of said motor shaft;
   a digital to analog converter means, operatively coupled to said up/down counter means, for converting the digital output of said up/down counter means into a representive analog signal;
   a servo amplifier, operatively coupled to said digital to analog converter means and said motor for amplifying and conditioning said analog signal and electrically driving said motor with said amplified and conditioned analog signal;

wherein the controlled incremental rate of the varying of the position of the shaft of the motor is directly related to the pulse repetition rate of said serial input command pulses.

2. A closed loop, error correcting serial input positioning system as in claim 1, further comprising a sign bit generator means, operatively coupled to said multiplexer means and said encoder means, for controlling said up/down counter means to count in one of either the up direction or the down direction in dependance upon said encoder signals and a direction command signal.

3. A closed loop, error correcting serial input positioning system as in claim 2, wherein said sign bit generator means generates a sign bit having a first binary value and causes said up/down counter means to count up when one of either said input command pulses and encoder pulses indicate that the position of the motor shaft is counterclockwise from the desired position and causes said up/down counter means to count down when one of either said input command pulses and encoder pulses indicate that the position of the motor shaft is clockwise from the desired position; and wherein said sign bit generator means generates a sign bit having a second binary value and causes said up/down counter means to count down when one of either said input command pulses and encoder pulses indicate that the position of the motor shaft is clockwise from the desired position and causes said up/down counter means to count down when one of either said input command pulses and encoder pulses indicate that the position of the motor shaft is counterclockwise from the desired position.

4. A closed loop, error correcting serial input positioning system as in claims 1, 2, or 3 further comprising a clock verification means, connected to said encoder means, for determining the validity of said plurality of encoder pulses and for inhibiting said encoder pulses from said up/down counter means when said encoder pulses are invalid.

* * * * *

UNITED STATES PATENT AND TRADEMARK OFFICE
CERTIFICATE OF CORRECTION

PATENT NO. : 4,215,300
DATED : July 29, 1980
INVENTOR(S) : Schmidt

It is certified that error appears in the above-identified patent and that said Letters Patent is hereby corrected as shown below:

Column 1, line 11, "$O_2$" should be --$\theta_2$--.
Column 3, line 38, after "wrong" delete --,--;
          line 42, "$KH_3$" should be --$KH_z$--.
Column 4, line 60, "fin" should be --$f_{in}$--.   [Underline=italics]
Column 5, line 16, after "(i.e." insert --,--;
          line 23, "lage" should be --lead--.
Column 6, line 12, "though" should be --thought--;
          line 16, after "(i.e." insert --,--.
Column 7, line 19, "MC (Motion complete" should be --$\overline{MC}$ (MOTION complete)--;
          line 27, "The" should be --the--;
          line 66, ""1."" should be --"1",--.

Column 8, line 43, "tively." should be --tively.)--;
          line 59, "has" should be --have--;
Column 9, line 39, after "(i.e." insert --,--;
          line 64, "consisting" should be --consists--.
Column 10, line 3, after "A)" insert --.--;
          line 26, "exclusive or" should be --exclusive-or--.

Signed and Sealed this

Sixteenth Day of June 1981

[SEAL]

*Attest:*

RENE D. TEGTMEYER

*Attesting Officer*      *Acting Commissioner of Patents and Trademarks*